United States Patent
Lee

(10) Patent No.: US 9,075,401 B2
(45) Date of Patent: Jul. 7, 2015

(54) METHOD OF CORRECTING SENSOR, METHOD OF CONTROLLING MOTOR AND MOTOR CONTROL SYSTEM

(71) Applicant: SAMSUNG TECHWIN CO., LTD., Changwon (KR)

(72) Inventor: Jin-Seong Lee, Changwon (KR)

(73) Assignee: SAMSUNG TECHWIN CO., LTD., Changwon (KR)

( * ) Notice: Subject to any disclaimer, the term of this patent is extended or adjusted under 35 U.S.C. 154(b) by 205 days.

(21) Appl. No.: 13/622,004

(22) Filed: Sep. 18, 2012

(65) Prior Publication Data

US 2013/0147415 A1     Jun. 13, 2013

(30) Foreign Application Priority Data

Dec. 9, 2011    (KR) .................. 10-2011-0132125

(51) Int. Cl.
     *G05D 23/275*     (2006.01)
     *G03G 15/00*       (2006.01)
     *G05B 19/00*      (2006.01)

(52) U.S. Cl.
     CPC ........................... *G05B 19/00* (2013.01)

(58) Field of Classification Search
     CPC . G03F 7/70775; G05B 19/4015; G05B 19/00

USPC .............. 318/632, 560, 655, 661; 399/17; 702/151; 700/245

See application file for complete search history.

(56) References Cited

U.S. PATENT DOCUMENTS

| | | | | |
|---|---|---|---|---|
| 4,352,050 | A | * | 9/1982 | Sakano ................... 318/661 |
| 2007/0050086 | A1 | * | 3/2007 | Lim et al. ................ 700/245 |
| 2010/0247116 | A1 | * | 9/2010 | Wiener et al. ............. 399/17 |

FOREIGN PATENT DOCUMENTS

| | | |
|---|---|---|
| JP | 2003348895 A | 12/2003 |
| KR | 1020040105415 A | 12/2004 |
| KR | 1020060019994 A | 3/2006 |
| KR | 1020090104374 A | 10/2009 |

* cited by examiner

*Primary Examiner* — Bentsu Ro
*Assistant Examiner* — Zemenay Truneh
(74) *Attorney, Agent, or Firm* — Sughrue Mion, PLLC

(57) ABSTRACT

A method of correcting a sensor that detects a detection object and generates a detection signal includes: determining a homing-signal generation time difference between points of time when the detection signal is generated according to a direction in which the detection object enters the sensor and correcting a homing-signal generation time by using the determined homing-signal generation time difference.

16 Claims, 9 Drawing Sheets

METHOD OF CORRECTING SENSOR, METHOD OF CONTROLLING MOTOR AND MOTOR CONTROL SYSTEM

CROSS-REFERENCE TO RELATED PATENT APPLICATION

This application claims priority from Korean Patent Application No. 10-2011-0132125, filed on Dec. 9, 2011, in the Korean Intellectual Property Office, the disclosure of which is incorporated herein by reference in its entirety.

BACKGROUND

1. Field

Apparatuses and methods consistent with exemplary embodiments relate to a method of correcting a sensor, a method of controlling a motor, and a motor control system, and more particularly, to a method of correcting a sensor for detecting a detection object and generating a detection signal and a method of controlling a motor using the correction method.

2. Description of the Related Art

In most motor control systems, a current position of a rotatable object is determined according to position data output from an encoder, and an operation of a driving unit of a motor is controlled according to the current position.

By using a homing sensor, the encoder is initialized at a point in time when a homing signal for indicating that one complete rotation of the rotatable object has been completed is generated.

In order to perform precise position control for minimizing a control error in measuring a position of the rotatable object, a conventional motor control system uses an expensive encoder, or a complex correction algorithm executed by a control unit.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a method of correcting a sensor which may further improve the precision of the sensor. One or more exemplary embodiments also provide a method of controlling a motor and a motor control system which may perform precise position control for minimizing a control error without using an expensive encoder or a complex correction algorithm.

According to an aspect of an exemplary embodiment, there is provided a method of correcting a sensor that detects a detection object and generates at least one detection signal, the method including: determining a homing-signal generation time difference between points in time when the at least one detection signal is generated according to a direction in which the detection object enters the sensor; and correcting a homing-signal generation time by using the determined homing-signal generation time difference.

The determining of the time difference may include determining the homing-signal generation time difference which varies according to a speed at which the detection object enters.

The at least one detection signal comprises first and second homing signals, and the homing-signal generation time difference is calculated based on the first and second homing signal.

The homing-signal generation time difference is calculated further based on a width of the detection object.

The first homing signal is generated when the detection object is located at a first homing position and rotates in the first direction, and the second homing signal is generated when the detection object is located at a second homing position and rotates in the second direction.

The homing-signal generation time difference is calculated by an equation, $Tpos=|Tpos1-Tpos4|$, wherein $T_{pos}$ denotes the homing-signal generation time difference, $T_{pos1}$ denotes a point in time when the first homing signal is generated at the first homing position and $T_{pos4}$ denotes a point in time when the second homing signal is generated at the second homing position.

According to another aspect of an exemplary embodiment, there is provided a method of controlling a motor of a motor control system including a driving unit which drives a motor, an encoder which generates position data of a rotatable object being rotated by the motor, a homing sensor which generates a homing signal indicating that one rotation of the rotatable object has been completed, and a control unit, wherein the method is performed by the control unit, the method including: controlling an operation of the driving unit according to the position data output from the encoder; and when the homing signal is generated from the homing sensor, initializing the encoder by correcting a homing-signal generation time of the homing sensor using a homing-signal generation time difference according to a direction in which the rotatable object rotates.

The correcting of the homing-signal generation time includes determining the homing-signal generation time difference which varies according to a speed at which the detection object is entered into the homing sensor.

The homing-signal generation time difference is calculated based on a first homing signal and a second homing signal.

The first homing signal is generated when the detection object is located at a first homing position, and the second homing signal is generated when the detection object is located at a second homing position.

The first homing signal is generated when the detection object rotates in a first direction and the first homing signal is generated when the detection object rotates in a second direction.

The homing-signal generation time difference is calculated by an equation, $Tpos=|Tpos1-Tpos4|$, wherein $T_{pos}$ denotes the homing-signal generation time difference, $T_{pos1}$ denotes a point in time when the first homing signal is generated at the first homing position and $T_{pos4}$ denotes a point in time when the second homing signal is generated at the second homing position.

According to yet another aspect of an exemplary embodiment, there is provided a motor control system including: a driving unit which drives a motor; an encoder which generates position data of a rotatable object which is rotated by the motor; a homing sensor which generates a homing signal indicating that one rotation of the rotatable object has been completed; and a control unit which controls an operation of the driving unit according to the generated position data from the encoder, and when the homing signal is generated from the homing sensor, initializes the encoder by correcting a homing-signal generation time of the homing sensor with a homing-signal generation time difference of the homing sensor according to a direction in which the rotatable object rotates.

The homing-signal generation time difference of the homing sensor according to the direction in which the rotatable object rotates varies according to a speed at which the rotatable object rotates.

The homing-signal generation time difference of the homing sensor may be a time difference between a point in time when the homing signal begins to be generated when the rotatable object rotates in a first rotation direction and a point in time when the homing signal begins to be generated when the rotatable object rotates in a second rotation direction that is opposite to the first rotation direction.

The motor control system may further include a detection object which is detected by the homing sensor when one rotation of the rotatable object has been completed, wherein a time when the homing signal is generated is in accordance with a width of the detection object.

A portion to be detected of the detection object at a point in time when the generated homing signal may vary according to the direction in which the rotatable object rotates, wherein when the control unit corrects the homing-signal generation time difference of the homing sensor according to the direction in which the rotatable object rotates, the homing-signal generation time is corrected by using a finally corrected time difference.

The homing-signal generation difference varies according to a speed at which the rotatable object rotates.

The homing-signal generation time difference is calculated based on a first homing signal and a second homing signal, and the first homing signal is generated when the detection object is located at a first homing position. The second homing signal is generated when the detection object is located at a second homing position, and the first homing signal is generated when the detection object rotates in a first direction and the first homing signal is generated when the detection object rotates in a second direction.

The homing-signal generation time difference is calculated by an equation, Tpos=|Tpos1−Tpos4|, wherein $T_{pos}$ denotes the homing-signal generation time difference, $T_{pos1}$ denotes a point in time when the first homing signal is generated at the first homing position and $T_{pos4}$ denotes a point in time when the second homing signal is generated at the second homing position.

According to the method of correcting a sensor according to the exemplary embodiment, since hysteresis corresponding to a time difference which occurs as the sensor has a width in directions in which a detection object is entered is corrected, the precision of the sensor may be improved.

Furthermore, since a time difference, which varies according to a speed at which a detection object is entered, is set, the precision of the sensor may be further improved.

In the method of controlling a motor and the motor control system of the an exemplary embodiment, there is a homing-signal generation time difference of a homing sensor according to a direction in which a rotatable object rotates and accumulated errors occur due to the homing-signal generation time difference. Accordingly, a control unit initializes an encoder by correcting the homing-signal generation time difference.

Accordingly, according to the method of controlling the motor and the motor control system of the exemplary embodiment, since the accumulated errors due to the homing-signal generation time difference are removed, precise position control for minimizing a control error may be performed without using an expensive encoder or a complex correction algorithm.

Furthermore, it is found that the homing-signal generation time difference of the homing sensor according to a direction in which the rotatable object rotates varies according to a speed at which the rotatable object rotates.

Accordingly, since the homing-signal generation time difference of the homing sensor according to the direction in which the rotatable object rotates is set to vary according to the speed at which the rotatable object rotates, more precise position control may be performed.

Furthermore, it is found that due to the width of the detection object by the homing sensor, a portion to be detected of the detection object at a point in time when a homing signal begins to be generated varies according to the direction in which the rotatable object rotates.

Accordingly, since the homing-signal generation time difference is corrected by using a time difference which occurs because portions to be detected of the detection object are different, more precise position control may be performed.

When the homing-signal generation time difference of the homing sensor is set to vary according to the speed at which the rotatable object rotates and the homing-signal generation time difference is corrected by using the time difference which occurs because the portions to be detected are different, very precise position control may be performed.

BRIEF DESCRIPTION OF THE DRAWINGS

The above and other aspects will become more apparent by describing in detail exemplary embodiments thereof with reference to the attached drawings in which.

DETAILED DESCRIPTION OF EXEMPLARY EMBODIMENTS

Figure 1:
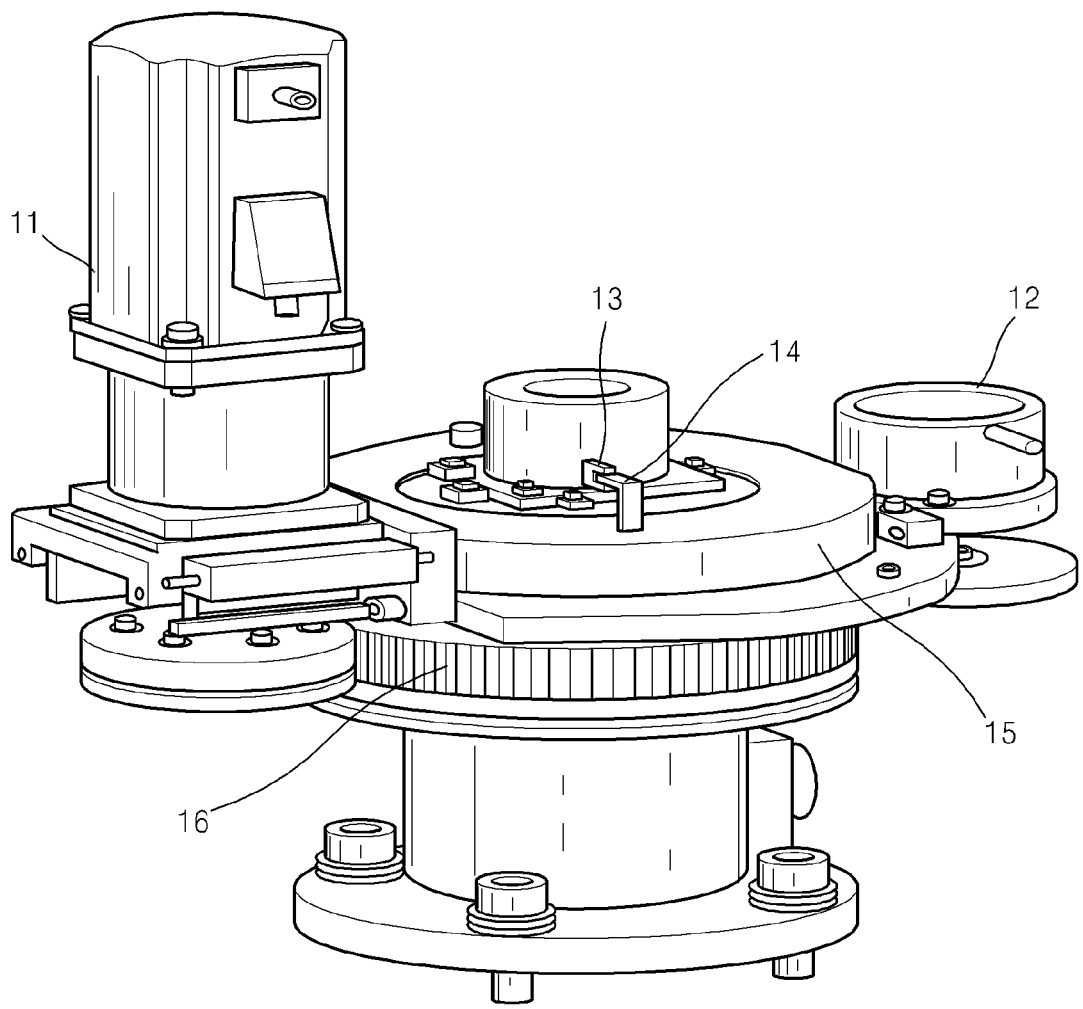
FIG. 1 is a perspective view illustrating a motor control system according to an exemplary embodiment.

The following description and the attached drawings are provided for better understanding of exemplary embodiments, and descriptions of techniques or structures related to exemplary embodiments which would be obvious to one of ordinary skill in the art will be omitted.

Also, the specification and the drawings should not be construed as limiting the scope of exemplary embodiments defined by the claims. The terms used herein should be construed as meanings and concepts matching the technical spirit of exemplary embodiments in order to describe exemplary embodiments in the best fashion.

Hereinafter, exemplary embodiments will now be described in detail with reference to the accompanying drawings. Like reference numerals in the drawings denote like elements.

FIG. 1 is a perspective view illustrating a motor control system according to an exemplary embodiment. In FIG. 1, reference numeral 11 denotes a motor included in a driving unit, 12 denotes an encoder, 13 denotes a homing sensor, 14 denotes a detection object in FIG. 1, 15 denotes a rotatable object, and 16 denotes a power transmitting unit which is a gear in FIG. 1.

Figure 2:
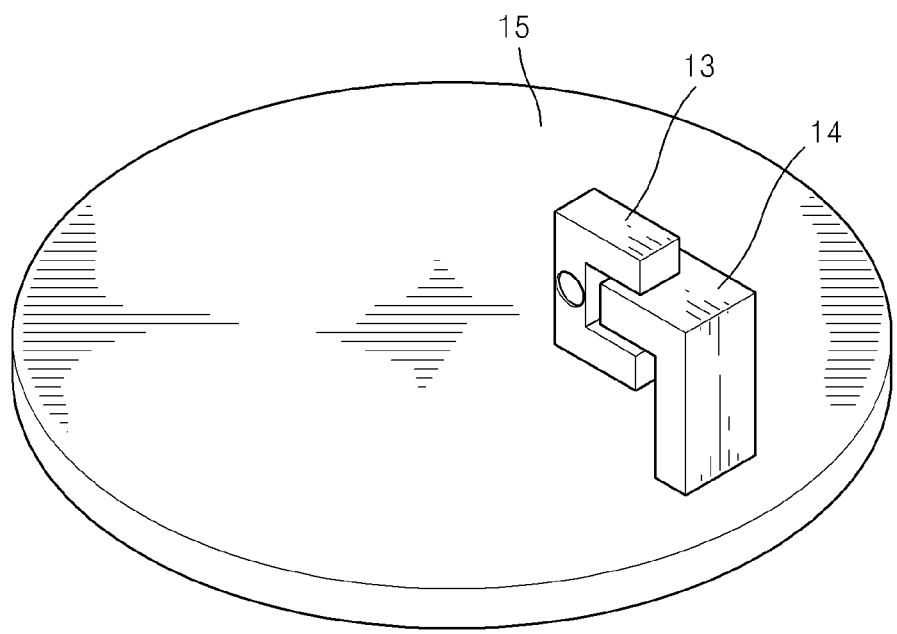
FIG. 2 is an enlarged perspective view illustrating a homing sensor and a detection object in FIG. 1.

FIG. 2 is an enlarged perspective view illustrating the homing sensor 13 and the detection object 14 in FIG. 1.

Figure 3:
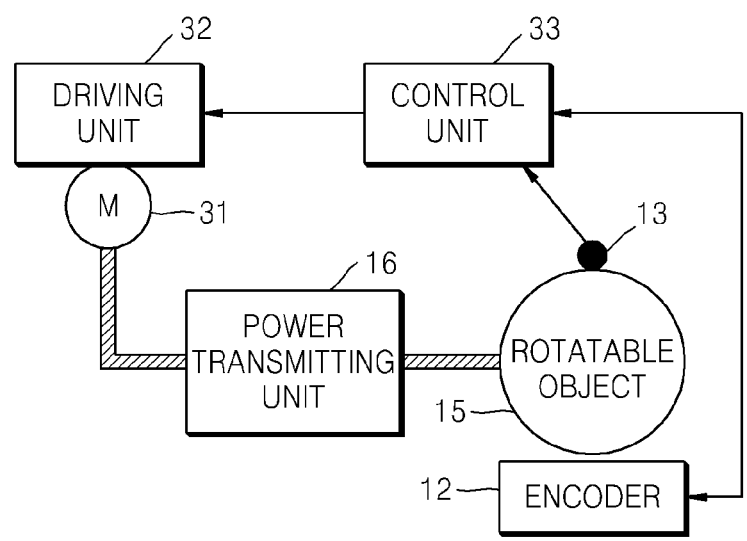
FIG. 3 is a block diagram illustrating the motor control system of FIG. 1.

FIG. 3 is a block diagram illustrating the motor control system of FIG. 1. The same elements as those of FIG. 1 are denoted by the same reference numerals.

Referring to FIGS. 1 through 3, the motor control system includes a driving unit 32, the encoder 12, the homing sensor 13, and a control unit 33.

The driving unit 32 drives a motor 31.

The encoder 12 generates position data of the rotatable object 15 which is rotated by the motor 31.

Although the encoder 12 is an incremental encoder in the present exemplary embodiment, the encoder 12 may be an absolute encoder.

Also, although the encoder 12 is an external encoder in the exemplary embodiment, the encoder 12 may be an internal encoder.

The homing sensor 13 which is a sensor to be corrected generates a homing signal indicating that one rotation of the rotatable object 15 has been completed. In the present exemplary embodiment, the homing sensor 13 is fixed and the detection object 14 rotates along with the rotatable object 15. However, the detection object 14 may be fixed and the homing sensor 13 may rotate along with the rotatable object 15.

The control unit 33 controls an operation of the driving unit 32 according to the position data output from the encoder 12, and when the homing signal is generated by the homing sensor 13, the control unit 33 initializes the encoder 12 by correcting a homing-signal generation time difference of the homing sensor 13 according to a direction in which the rotatable object 15 rotates. This is because the homing-signal generation time difference of the homing sensor 13 arises according to the direction in which the rotatable object 15 rotates and accumulated errors occur due to the homing-signal generation time difference.

That is, according to a method of correcting a sensor according to the exemplary embodiment, since hysteresis corresponding to a time difference which occurs as the homing sensor 13 has a width in a forward direction CW and a backward direction CCW in which the detection object 14 is entered is corrected, the precision of the homing sensor 13 may be improved.

Also, according to a method of controlling the motor 31 and the motor control system according to the exemplary embodiment, since accumulated errors due to a homing-signal generation time difference are removed, precise position control for minimizing a control error may be performed without using an expensive encoder or a complex correction algorithm.

Figure 4:
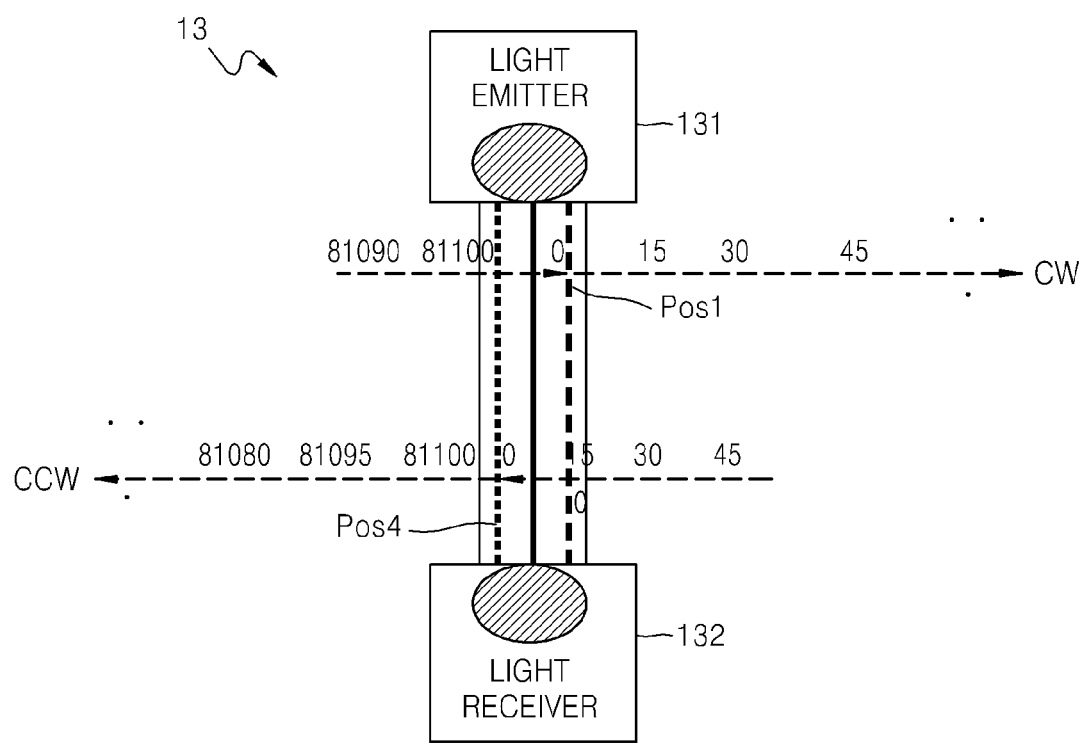
FIG. 4 is a view for explaining a homing-signal generation time difference of the homing sensor of FIG. 1 according to a direction in which a rotatable object rotates.

Various examples of correcting a homing-signal generation time difference of the homing sensor 13 according to a direction in which the rotatable object 15 rotates will be explained below. Although the homing sensor 13 includes a light emitter 131 and a light receiver 132 in the present exemplary embodiment as shown in FIG. 4, the following explanation may apply to any of homing sensors such as a proximity sensor, an ultrasonic sensor, and an infrared sensor. In summary, a sensor to be corrected in the present exemplary embodiment may be a sensor for detecting the detection object 14 and generating a detection signal, that is, a homing signal.

FIG. 4 is a view for explaining a homing-signal generation time difference of the homing sensor 13 of FIG. 1 according to a direction in which the rotatable object 15 (see FIGS. 1 through 3) rotates.

In FIG. 4, CW denotes the forward direction, CCW denotes the backward direction, Pos1 denotes a forward homing position, and Pos4 denotes a backward homing position.

Referring to FIGS. 1, 2, and 4, when the detection object 14 rotates in the forward direction CW, position data output from the encoder 12 increases, and when the detection object 14 rotates in the backward direction CCW, position data output from the encoder 12 decreases. A case where a width of the detection object 14 does not need to be considered will be explained.

When the detection object 14 is entered into the homing sensor 13 by rotating in the forward direction CW, the homing sensor 13 generates a homing signal at a point in time when the detection object 14 is located at the forward homing position Pos1.

Also, when the detection object 14 is entered into the homing sensor 13 by rotating in the backward direction CCW, the homing sensor 13 generates a homing signal at a point in time when the detection object 14 is located at the backward homing position Pos4.

When it is found that the forward homing position Pos1 and the backward homing position Pos4 when homing signals are generated are not the same, precise control may not be performed.

According to an exemplary embodiment, the light emitter 131 may be a light emitting diode (LED), in which case the homing positions Pos1 and Pos4 may correspond to two opposite edge positions from which right rays are emitted from the light emitter 131. Here, a virtual line connecting the two edges may substantially parallel to a direction in which the detection object 14 is entered into the homing sensor 13.

A difference between the forward homing position Pos1 and the backward homing position Pos4 may be expressed as a time difference related to the position data output from the encoder 12. That is, when a point in time when a homing signal is generated at the forward homing position Pos1 is $T_{pos1}$ and a point in time when a homing signal is generated at the backward homing position Pos4 is $T_{pos4}$, the control unit 33 may obtain a homing-signal generation time difference $T_{pos}$ by using Equation 1.

$$T_{pos} = |T_{pos1} - T_{pos4}| \qquad \text{[Equation 1]}$$

For example, even when the detection object 14 rotates in the backward direction CCW, in order to obtain the same effect as that when a homing signal is generated at the forward homing position Pos1, the control unit 33 subtracts the position data of the encoder 12 by as much as set encoder data (referred to as hysteresis data hereinafter) corresponding to the homing-signal generation time difference $T_{pos}$.

Figure 5:
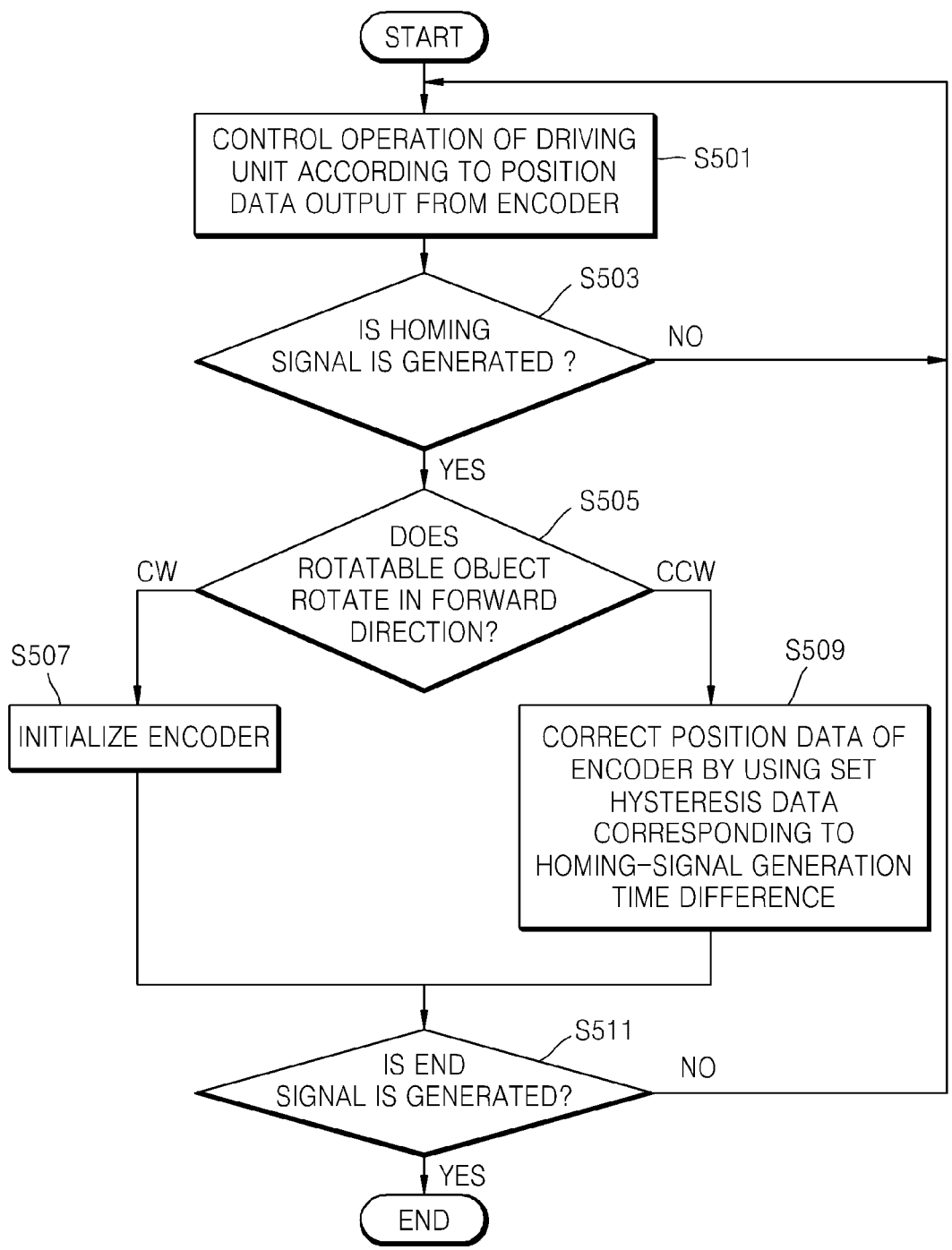
FIG. 5 is a flowchart illustrating an operation of a control unit of FIG. 3, according to an exemplary embodiment.

FIG. 5 is a flowchart illustrating an operation of the control unit 33 of FIG. 3, according to an exemplary embodiment. The operation of the control unit 33 will be explained with reference to FIGS. 3 through 5.

In operation S501, the control unit 33 controls an operation of the driving unit 32 according to position data output from the encoder 12.

In operation S503, it is determined whether a homing signal is generated. When it is determined in operation S503 that the homing signal is generated, the method proceeds to operation S505. In operation S505, the control unit 33 determines whether a direction in which the motor 31, that is, the rotatable object 15, rotates is the forward direction CW. Here, the forward direction CW is a reference direction for correction and the backward direction CCW is a direction to be corrected, or vice versa.

When it is determined in operation S505 that the direction in which the rotatable object 15 rotates is the forward direction CW, the method proceeds to operation S507. In operation S507, the control unit 33 initializes the encoder 12.

When it is determined in operation S505 that the direction in which the rotatable object 15 rotates is the backward direction CCW, the method proceeds to operation S509. In operation S509, the control unit 33 corrects the position data of the encoder 12 by using set hysteresis data according to a homing-signal generation time difference (for example, through subtraction as described in Equation 1).

In operation S511, it is determined whether an end signal is generated. Operations S501 through S509 are repeatedly performed until the end signal is generated.

Figure 6:
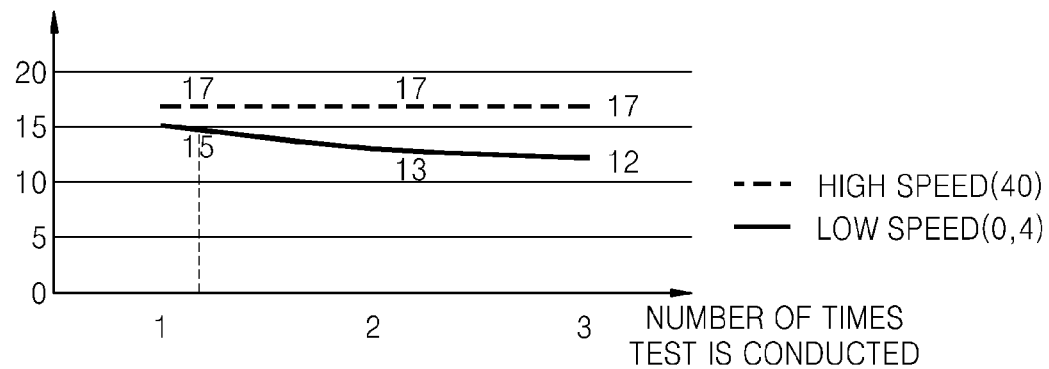
FIG. 6 is a graph illustrating that hysteresis data according to the homing-signal generation time difference of the homing sensor varies according to a speed at which the rotatable object rotates.

FIG. 6 is a graph illustrating that hysteresis data corresponding to a homing-signal generation time difference of the homing sensor 13 (see FIG. 3) varies according to a speed at which the rotatable object 15 (see FIG. 3) rotates.

Referring to FIGS. 3 and 6, when the rotatable object 15 rotates at 40 deg/sec, hysteresis data is 17. However, when the rotatable object 15 rotates at 0.4 deg/sec, hysteresis data ranges from 12 to 15.

Accordingly, when a homing-signal generation time difference of the homing sensor 13 according to a direction in which the rotatable object 15 rotates is set to vary according to a speed at which the rotatable object 15 rotates, more precise position control may be performed.

Figure 7:
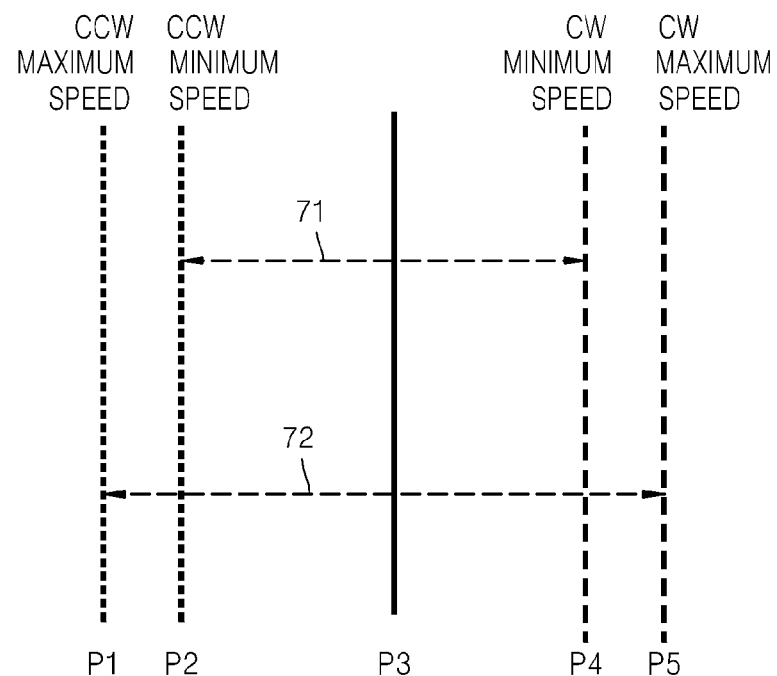
FIG. 7 is a graph illustrating that hysteresis data according to the homing-signal generation time difference of the homing sensor is set to vary according to the speed at which the rotatable object rotates.

FIG. 7 is a graph illustrating that hysteresis data corresponding to a homing-signal generation time difference of the homing sensor 13 (see FIG. 3) is set to vary according to a speed at which the rotatable object 15 rotates. In FIG. 7, reference numeral 71 denotes hysteresis data at a minimum speed, 72 denotes hysteresis data at a maximum speed, P1 and P2 denote backward homing positions, P3 denotes a central position, and P4 and P5 denote forward homing positions.

Referring to FIGS. 3, 4, and 7, hysteresis data corresponding to a distance between the forward homing positions P4 and P5 and the backward homing positions P1 and P2 ranges from the hysteresis data 71 at the minimum speed to the hysteresis data 72 at the maximum speed.

Figure 8:
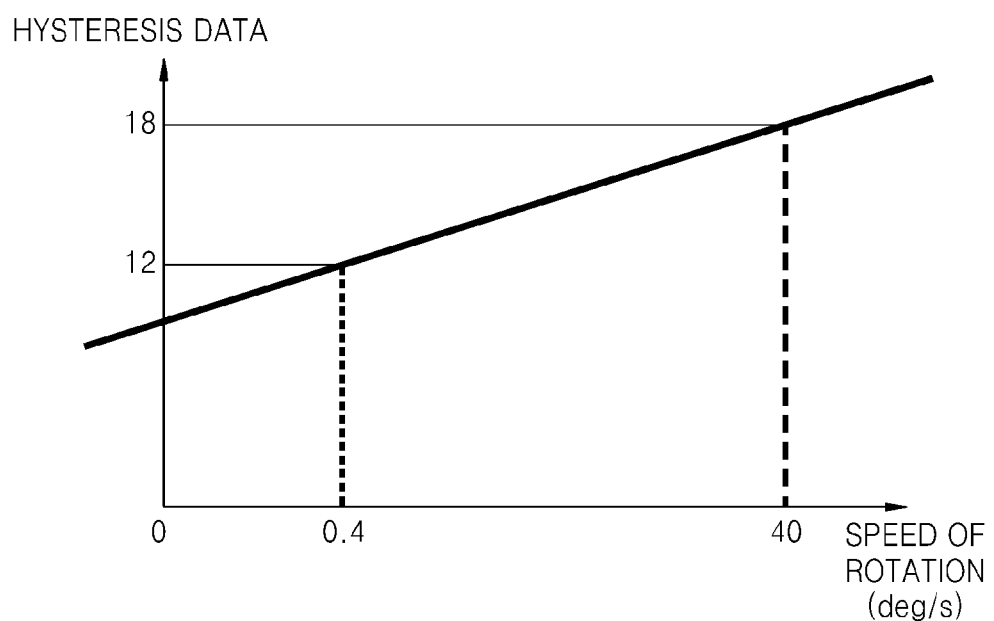
FIG. 8 is a graph illustrating a relationship between hysteresis data and a speed at which the rotatable object rotates.

FIG. 8 is a graph illustrating a relationship between hysteresis data and a speed at which the rotatable object 15 rotates.

Referring to FIGS. 3, 7, and 8, hysteresis data may linearly vary according to a speed at which the rotatable object 15 rotates. As such, when a homing-signal generation time difference of the homing sensor 13 according to a direction in which the rotatable object 15 rotates is set to vary according to a speed at which the rotatable object 15 rotates, more precise position control may be performed. An operation of the control unit 33 in this case will be explained with reference to FIG. 9.

Figure 9:
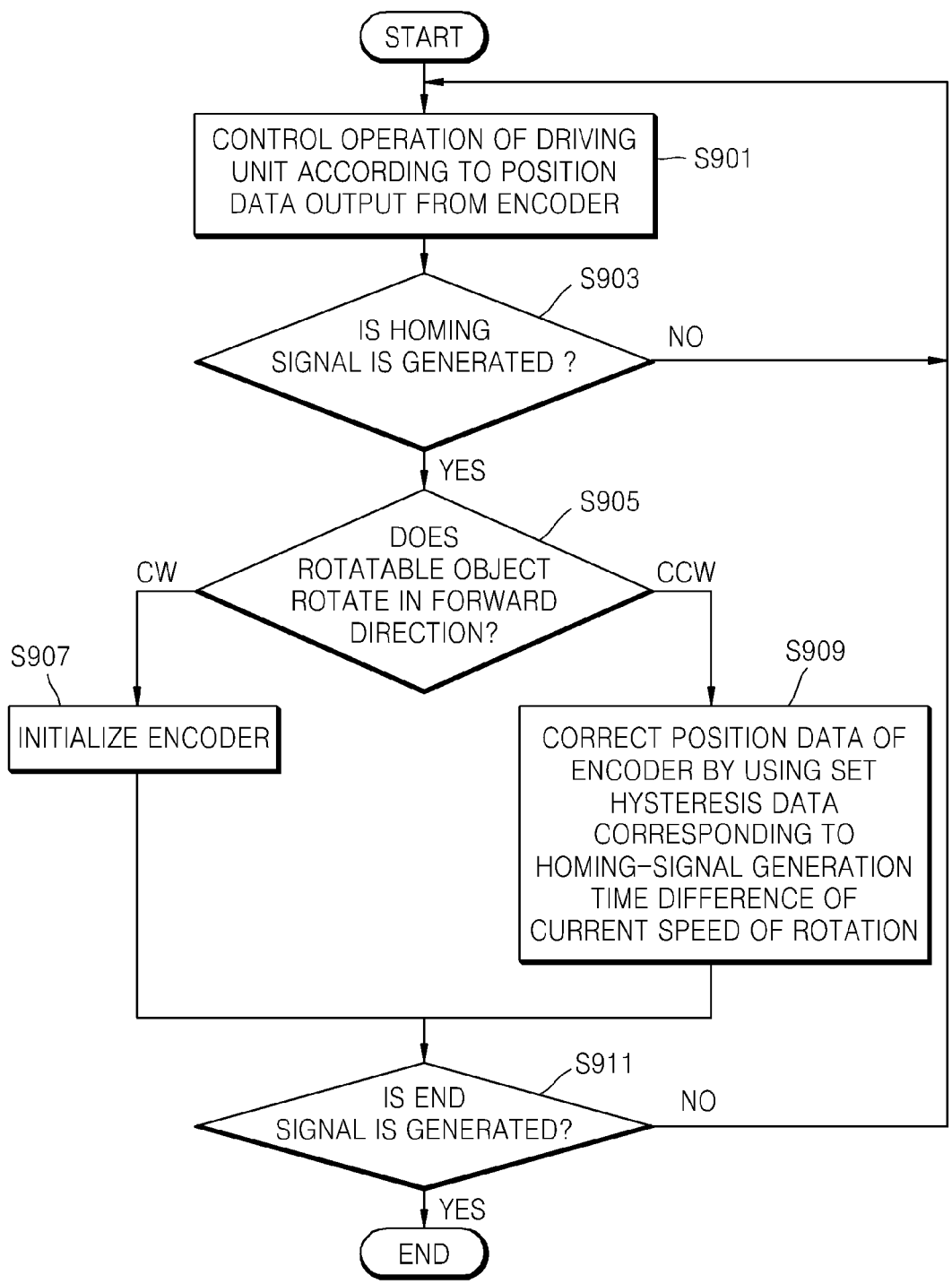
FIG. 9 is a flowchart illustrating an operation of the control unit of FIG. 3, according to another exemplary embodiment.

FIG. 9 is a flowchart illustrating an operation of the control unit 33 of FIG. 3, according to another exemplary embodiment. The operation of the control unit 33 will be explained with reference to FIGS. 3, 8, and 9.

In operation S901, the control unit 33 controls an operation of the driving unit 32 according to position data output from the encoder 12.

In operation S903, it is determined whether a homing signal is generated. When it is determined in operation S903 that the homing signal is generated, the method proceeds to operation S905. In operation S905, the control unit 33 determines whether a direction in which the motor 31, that is, the rotatable object 15, rotates is the forward direction CW. Here, the forward direction CW is a reference direction for correction and the backward direction CCW is a target direction to be corrected, or vice versa.

When it is determined in operation S905 that the direction in which the rotatable object 15 rotates is the forward direction CW, the method proceeds to operation S907. In operation S907, the control unit 33 initializes the encoder 12.

When it is determined in operation S905 that the direction in which the rotatable object 15 is the backward direction CCW, the method proceeds to operation S909. In operation S909, the control unit 33 corrects the position data of the encoder 12 by using set hysteresis data corresponding to a homing-signal generation time difference of a current speed of rotation.

In operation S911, it is determined whether an end signal is generated. Operations S901 through S909 are repeatedly performed until the end signal is generated.

In summary, according to the method of FIG. 9, hysteresis corresponding to a time difference, which occurs due to the homing sensor 13 having a width in the forward direction CW and the backward direction CCW in which the detection object 14 is entered, is corrected, and a time difference, which varies according to a speed at which the detection object 14 is entered, is used.

Accordingly, the precision of the homing sensor 13 may be further improved.

Figure 10:
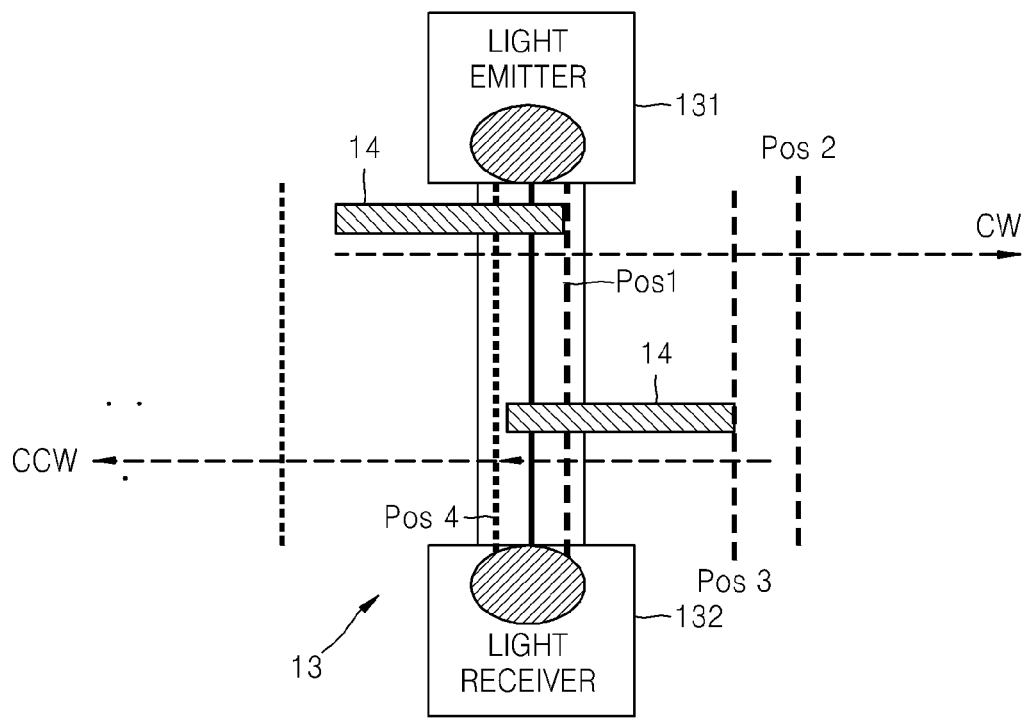
FIG. 10 is a view for explaining a case where a portion to be detected of the detection object of FIG. 2 varies according to a direction in which the rotatable object rotates, thereby causing a time difference, for which the homing-signal generation time difference is to be corrected by using the time difference.

FIG. 10 is a view for explaining a case where a portion to be detected of the detection object 14 of FIG. 2 varies according to a direction in which the rotatable object 15 rotates, thereby causing a time difference, and thus a homing-signal generation time difference is corrected by using the time difference. The same elements as those of FIG. 4 are denoted by the same reference numerals. In FIG. 10, reference numeral Pos1 denotes a forward homing position, Pos2 denotes a forward width position, Pos3 denotes a backward right end position, and Pos4 denotes a backward homing position.

Referring to FIGS. 3, 4, and 10, a time when a homing signal is generated is in accordance with a detection width Pos2–Pos1 of the detection object 14 which is detected by the homing sensor 13 when one rotation of the rotatable object 15 has been completed.

Accordingly, a homing-signal generation time difference of the homing sensor 13 is a difference between a point in time when a homing signal begins to be generated when the rotatable object 15 rotates in the forward direction CW which is a first rotation direction and a point in time when a homing signal begins to be generated when the rotatable object 15 rotates in the backward direction CCW which is a second rotation direction.

That is, further to the methods of FIGS. 5 and 9, referring to FIG. 10, as the detection object 14 has the detection width Pos2−Pos1, a portion to be detected of the detection object 14 at a point in time when a homing signal begins to be generated varies according to a direction in which the rotatable object 15 rotates.

Referring to FIG. 10, the homing-signal generation time difference $T_{pos}$ of the homing sensor 13 may also be obtained by using Equation 1.

However, a portion of the detection object 14 at a point in time when a homing signal begins to be generated when the rotatable object 15 rotates in the forward direction CW is a right end whereas a portion to be detected of the detection object 14 at a point in time when a homing signal begins to be generated when the rotatable object 15 rotates in the backward direction CCW is a left end. That is, a time difference which occurs because portions to be detected are different is a time corresponding to the detection width Pos2−Pos1 of the detection object 14.

Accordingly, when the control unit 33 corrects the homing-signal generation time difference $T_{pos}$ of the homing sensor 13 according to a direction in which the rotatable object 15 rotates, the homing-signal generation time difference $T_{pos}$ is corrected by using a time difference which occurs because portions to be detected are different.

For example, referring to FIG. 10, when a point in time when a homing signal begins to be generated when the rotatable object 15 rotates in the forward direction CW is a reference point in time, a point in time when a homing signal begins to be generated when the rotatable object 15 rotates in the backward direction CCW is slower than the reference point in time by the homing-signal generation time difference $T_{pos}$.

However, considering a time difference which occurs because portions to be detected are different, when a portion to be detected when the rotatable object 15 rotates in the forward direction CW, that is, a right end, is a reference portion, a point in time when a homing signal begins to be generated when the rotatable object 15 rotates in the backward direction CW is faster by a time corresponding to the detection width Pos2−Pos1 of the detection object 14.

When a point in time when a homing signal is generated at the forward homing position Pos1 is $T_{pos1}$, a point in time when a homing signal is generated at the backward homing position Pos4 is $T_{pos4}$, and a time corresponding to the forward width position Pos2 is $T_{pos2}$, the control unit 33 may obtain a homing-signal generation time difference to be finally corrected $T_{posf}$ by using Equation 2.

$$Tposf = (|Tpos2 - Tpos1|) - (|Tpos1 - Tpos4|) \quad \text{[Equation 2]}$$

When a time corresponding to the backward right end position Pos3 is $T_{pos3}$, the control unit 33 may obtain the homing-signal generation time difference to be finally corrected $T_{posf}$ by using Equation 3 or 4.

$$Tposf = (|Tpos2 - Tpos1|) - (|Tpos2 - Tpos3|) \quad \text{[Equation 3]}$$

$$Tposf = (|Tpos3 - Tpos1|) \quad \text{[Equation 4]}$$

As such, since a homing-signal generation time difference is corrected by using a time difference which occurs because portions to be detected of the detection object 14 are different, more precise position control may be performed.

When the homing-signal generation time difference of the homing sensor 13 is set to vary according to a speed at which the rotatable object 15 rotates and the homing-signal generation time difference is corrected by using a time difference which occurs because portions to be detected are different, very precise position control may be performed.

Figure 11:
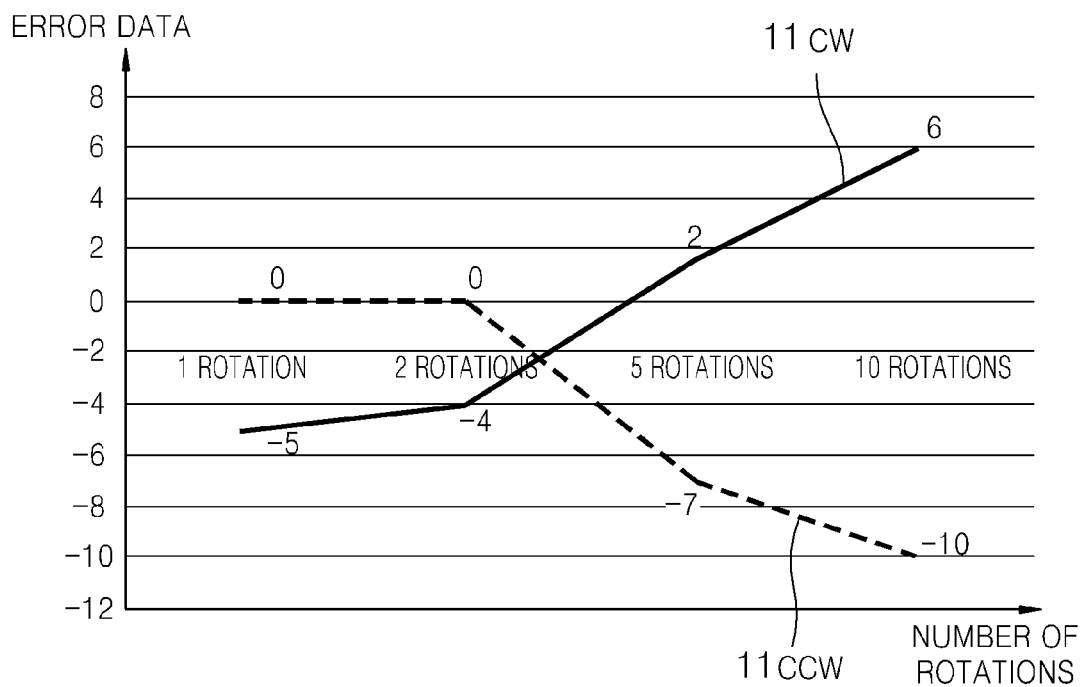
FIG. 11 is a graph illustrating error data which varies according to a direction of rotation in a conventional motor control system.

FIG. 11 is a graph illustrating error data which varies according to a direction in which the rotatable object 15 rotates in a conventional motor control system.

In FIG. 11, reference numeral 11 cw denotes a graph illustrating error data when the rotatable object 15 rotates in a forward direction, and 11 ccw is a graph illustrating error data when the rotatable object 15 rotates in a backward direction.

Referring to FIG. 11, it is found that as the number of rotations increases, accumulated errors in the forward direction and the backward direction increase, resulting in opposite characteristics.

Figure 12:
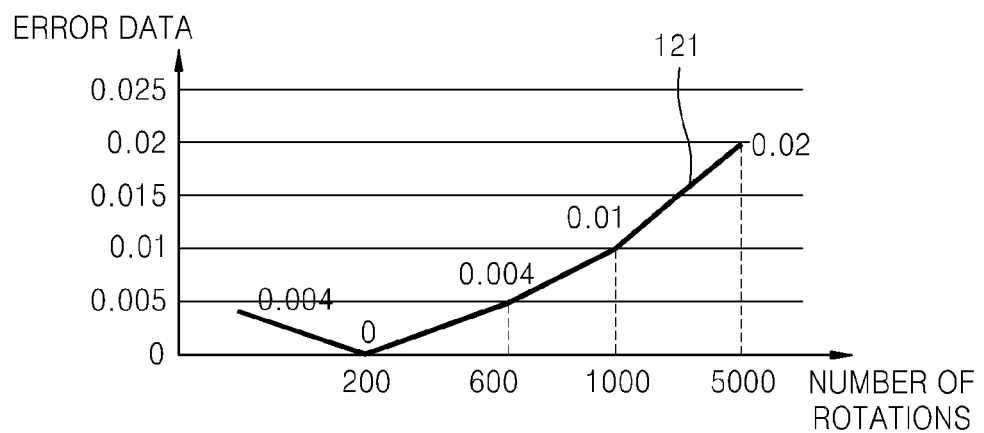
FIG. 12 is a graph illustrating error data which is not related to a direction in which the rotatable object rotates when the method of FIG. 10 is used.

FIG. 12 is a graph 121 illustrating error data which is not related to a direction in which the rotatable object 15 rotates when the method of FIG. 10 is used.

When FIGS. 11 and 12 are compared with each other, according to the motor control system of the present exemplary embodiment, it is found that accumulated errors in a forward direction and a backward direction slightly increase, resulting in same characteristics.

As described above, according to the method of correcting a sensor according to the exemplary embodiment, hysteresis corresponding to a time difference, which occurs due to the sensor having a width in directions in which a detection object 14 is entered, is corrected. Accordingly, the precision of the sensor may be improved.

Furthermore, since a time difference, which varies according to a speed at which a detection object 14 is entered, is set, the precision of the sensor may be further improved.

In the method of controlling a motor and the motor control system of the exemplary embodiment, a homing-signal generation time difference of a homing sensor 13 arises according to a direction in which a rotatable object 15 rotates and accumulated errors occur due to the homing-signal generation time difference. Accordingly, a control unit 33 initializes an encoder 12 by correcting the homing-signal generation time difference.

Thus, according to the method of controlling the motor and the motor control system of the exemplary embodiment, since the accumulated errors due to the homing-signal generation time difference are removed, precise position control for minimizing a control error may be performed without using an expensive encoder or a complex correction algorithm.

Furthermore, it is found that the homing-signal generation time difference of the homing sensor 13 according to a direction in which the rotatable object 15 rotates varies according to a speed at which the rotatable object 15 rotates.

Accordingly, since the homing-signal generation time difference of the homing sensor 13 according to the direction in which the rotatable object 15 rotates is set to vary according to the speed at which the rotatable object 15 rotates, more precise position control may be performed.

Furthermore, it is found that due to the width of the detection object 14 by the homing sensor 13, a portion to be detected of the detection object 14 at a point in time when a homing signal begins to be generated varies according to the direction in which the rotatable object 15 rotates.

Accordingly, since the homing-signal generation time difference is corrected by using a time difference which occurs because portions to be detected of the detection object 14 are different, more precise position control may be performed.

Of course, when the homing-signal generation time difference of the homing sensor 13 is set to vary according to the speed at which the rotatable object 15 rotates and the homing-signal generation time difference is corrected by using the time difference which occurs because the portions to be detected are different, very precise position control may be performed.

While exemplary embodiments have been particularly shown and described above using specific terms, exemplary embodiments and terms have been used to explain the present inventive concept and should not be construed as limiting the scope of the present inventive concept defined by the claims. The exemplary embodiments should be considered in a descriptive sense only and not for purposes of limitation.

What is claimed is:

1. A method of correcting a sensor configured to detect a detection object and generate at least one detection signal, the method comprising:
    rotating the detection object or the sensor from an initial position in a first direction to generate a first homing signal when the detection object is located at a first homing position rotating in the first direction;
    rotating the detection object or the sensor from the initial position in a second direction to generate a second homing signal when the detection object is located at a second homing position rotating in the second direction, the second direction being opposite to the first direction and the second homing position being opposite from the first homing position with respect to a center portion of the sensor in a rotation direction;
    determining a first time duration and a second time duration according to the first and second homing signals, respectively;
    determining a homing-signal generation time difference corresponding to a time difference between the first and second time duration; and
    correcting a homing-signal generation time of the sensor by using the determined homing-signal generation time difference,
    wherein the first and second homing positions correspond to positions of the detection object and the sensor overlapping each other.

2. The method of claim 1, wherein the determining the homing-signal generation time difference comprises determining the time difference which varies according to a speed at which the detection object enters the sensor.

3. The method of claim 1, wherein the homing-signal generation time difference is calculated further based on a width of the detection object.

4. The method of claim 1, wherein the homing-signal generation time difference is calculated by an equation, $T_{pos}=|T_{pos1}-T_{pos4}|$,
    wherein $T_{pos}$ denotes the homing-signal generation time difference, $T_{pos1}$ denotes a point in time when the first homing signal is generated at the first homing position and $T_{pos4}$ denotes a point in time when the second homing signal is generated at the second homing position.

5. The method of claim 1, wherein the homing-signal generation time is a point in time when a homing signal of the at least one detection signal is generated by the sensor.

6. A method of controlling a motor of a motor control system comprising a driving unit configured to drive the motor, an encoder configured to generate position data of a rotatable object being rotated by the motor, a homing sensor configured to generate a homing signal indicating that one rotation of the rotatable object has been completed using a detection object of the rotatable object, and a control unit, wherein the method is performed by the control unit, the method comprising:
    controlling an operation of the driving unit according to the position data output from the encoder; and
    initializing the encoder, the initializing comprising:
    rotating the rotatable object or the sensor from an initial position in a first direction to generate a first homing signal when the detection object is located at a first homing position rotating in the first direction;
    rotating the rotatable object or the sensor from the initial position in a second direction to generate a second homing signal when the detection object is located at a second homing position rotating in the second direction, the second direction being opposite to the first direction and the second position location opposite from the first position with respect to a center portion of the homing sensor in a rotation direction;
    determining a first duration and a second duration according to the first and second homing signals, respectively; and
    correcting a homing-signal generation time of the homing sensor using a homing-signal generation time difference corresponding to a time difference between the first and second duration,
    wherein the first and second homing positions correspond to positions of the detection object and the sensor overlapping each other.

7. The method of claim 6, wherein the correcting of the homing-signal generation time comprises determining the homing-signal generation time difference which varies according to a speed at which the detection object is entered into the homing sensor.

8. The method of claim 6, wherein the homing-signal generation time difference is calculated by an equation, $T_{pos}=|T_{pos1}-T_{pos4}|$,
    wherein $T_{pos}$ denotes the homing-signal generation time difference, $T_{pos1}$ denotes a point in time when the first homing signal is generated at the first homing position and $T_{pos4}$ denotes a point in time when the second homing signal is generated at the second homing position.

9. The method of claim 6, wherein the homing-signal generation time is a point in time when the homing signal is generated by the homing sensor.

10. A motor control apparatus comprising:
    a driving unit configured to drive a motor;
    an encoder configured to generate position data of a rotatable object being rotated by the motor, the rotatable object comprising a detection object which is detected by a homing sensor when one rotation of the rotatable object has been completed;
    the homing sensor configured to generate a homing signal indicating that one rotation of the rotatable object has been completed; and
    a control unit configured to control an operation of the driving unit according to the generated position data from the encoder, and when the homing signal is generated from the homing sensor, initializes the encoder by:
    controlling the rotatable object or the sensor to rotate from an initial position in a first direction to generate a first homing signal when the detection object is located at a first homing position rotating in the first direction;
    controlling the rotatable object or the sensor to rotate from the initial position in a second direction to generate a second homing signal when the detection object is located at a second homing position rotating in the second direction, the second direction being opposite to the first direction and the second position location opposite from the first position with respect to a center portion of the homing sensor in a rotation direction; and determining a first duration and a second duration according to the first and second homing signals, respectively, and corrects a homing-signal generation time of the homing sensor with a homing-signal generation time difference corresponding to a time difference between the first and second duration, wherein the first and second homing positions correspond to positions of the detection object and the sensor overlapping each other.

11. The motor control apparatus of claim 10, wherein the homing-signal generation time difference of the homing sensor varies according to a speed at which the rotatable object rotates.

12. The motor control apparatus of claim 10,
wherein a time when the homing signal is generated is in accordance with a width of the detection object.

13. The motor control apparatus of claim 12, wherein a portion to be detected of the detection object at a point in time when the generated homing signal varies according to the direction in which the rotatable object rotates, wherein when the control unit corrects the homing-signal generation time of the homing sensor according to the direction in which the rotatable object rotates, the homing-signal generation time is corrected by using a finally corrected time difference.

14. The motor control apparatus of claim 13, wherein the homing-signal generation difference varies according to a speed at which the rotatable object rotates.

15. The motor control apparatus of claim 10, wherein the homing-signal generation time difference is calculated by an equation, $Tpos=|Tpos1-Tpos4|$, wherein $T_{pos}$ denotes the homing-signal generation time difference, $T_{pos1}$ denotes a point in time when the first homing signal is generated at the first homing position and $T_{pos4}$ denotes a point in time when the second homing signal is generated at the second homing position.

16. The motor control apparatus of claim 10, wherein the homing-signal generation time is a point in time when the homing signal is generated by the homing sensor.

* * * * *